(12) United States Patent
Dufour et al.

(10) Patent No.: US 10,484,400 B2
(45) Date of Patent: Nov. 19, 2019

(54) DYNAMIC SENSORS

(71) Applicant: Webroot Inc., Broomfield, CO (US)

(72) Inventors: David Dufour, Superior, CO (US); Hal Lonas, Carlsbad, CA (US)

(73) Assignee: Webroot Inc., Broomfield, CO (US)

( * ) Notice: Subject to any disclaimer, the term of this patent is extended or adjusted under 35 U.S.C. 154(b) by 126 days.

(21) Appl. No.: 15/655,653

(22) Filed: Jul. 20, 2017

(65) Prior Publication Data
US 2018/0026995 A1 Jan. 25, 2018

Related U.S. Application Data

(60) Provisional application No. 62/364,554, filed on Jul. 20, 2016.

(51) Int. Cl.
| | | |
|---|---|---|
| *H04L 29/06* | (2006.01) | |
| *G06N 20/00* | (2019.01) | |
| *G06N 5/04* | (2006.01) | |
| *G06F 21/57* | (2013.01) | |
| *H04W 12/12* | (2009.01) | |
| *H04W 4/70* | (2018.01) | |

(52) U.S. Cl.
CPC ........ *H04L 63/1408* (2013.01); *G06F 21/577* (2013.01); *G06N 5/04* (2013.01); *G06N 20/00* (2019.01); *H04W 4/70* (2018.02); *H04W 12/12* (2013.01)

(58) Field of Classification Search
CPC ......... G06N 5/04; G06N 99/005; H04W 4/70; H04W 12/12; G06F 21/577; H04L 63/1408
See application file for complete search history.

(56) References Cited

U.S. PATENT DOCUMENTS

| | | |
|---|---|---|
| 2015/0033341 A1 | 1/2015 | Schmidtler et al. |
| 2015/0302220 A1 | 10/2015 | Cismas et al. |
| 2016/0065610 A1 | 3/2016 | Peteroy et al. |
| 2017/0046510 A1* | 2/2017 | Chen ............... G06F 21/552 |

FOREIGN PATENT DOCUMENTS

WO    2002101516    12/2002

OTHER PUBLICATIONS

PCT International Search Report and Written Opinion in PCT/US2017/043143, dated Sep. 27, 2017, 12 pages.
PCT International Preliminary Report on Patentability in PCT/US2017/043143, dated Jan. 22, 2019, 6 pages.

* cited by examiner

*Primary Examiner* — Tri M Tran

(57) ABSTRACT

Examples of the present disclosure describe systems and methods for generating dynamic sensors. In aspects, a device may be detected on a network. If the device is not recognized by the network, a generic container may be created. If the device is recognized by the network, a device-specific container may be created, and device-specific threat protection and/or a device-specific machine model may be loaded into the container. In either case, a threat intelligence model and/or an ecosystem-specific machine model may also be loaded into the container. The container may then be deployed to one or more networks. In aspects, the container may be used to analyze network traffic to sense potential threats for ecosystems comprising varying devices and topologies.

20 Claims, 5 Drawing Sheets

DYNAMIC SENSORS

CROSS-REFERENCE TO RELATED APPLICATIONS

This application claims priority from U.S. Provisional Patent Application No. 62/364,554, filed Jul. 20, 2016, entitled "DYNAMIC SENSORS," which application is incorporated herein by reference in its entirety.

BACKGROUND

Given the ever-expanding realm of the internet of things (IoT) network, cybersecurity has become a paramount concern. Historically, cybersecurity has been implemented by individual endpoint agents. However, in light of the increased use of IoT devices that either cannot support endpoint agents or are configured proprietarily, building individualized endpoint agents has become cost prohibitive and less common. Instead, the trend has been to provide cybersecurity at the network level. The problem with such a trend is that networks face ever-shifting danger in the form of transient device threats, network-borne threats, and ecosystem-specific threats.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods for generating dynamic sensors. In aspects, a device may be detected on a network. If the device is not recognized by the network, a generic container may be created. If the device is recognized by the network, a device-specific container may be created, and device-specific threat protection and/or a device-specific machine model may be loaded into the container. In either case, a threat intelligence model and/or an ecosystem-specific machine model may also be loaded into the container. The container may then be deployed to one or more networks. In aspects, the container may be used to analyze network traffic to sense potential threats for ecosystems comprising varying devices and topologies.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
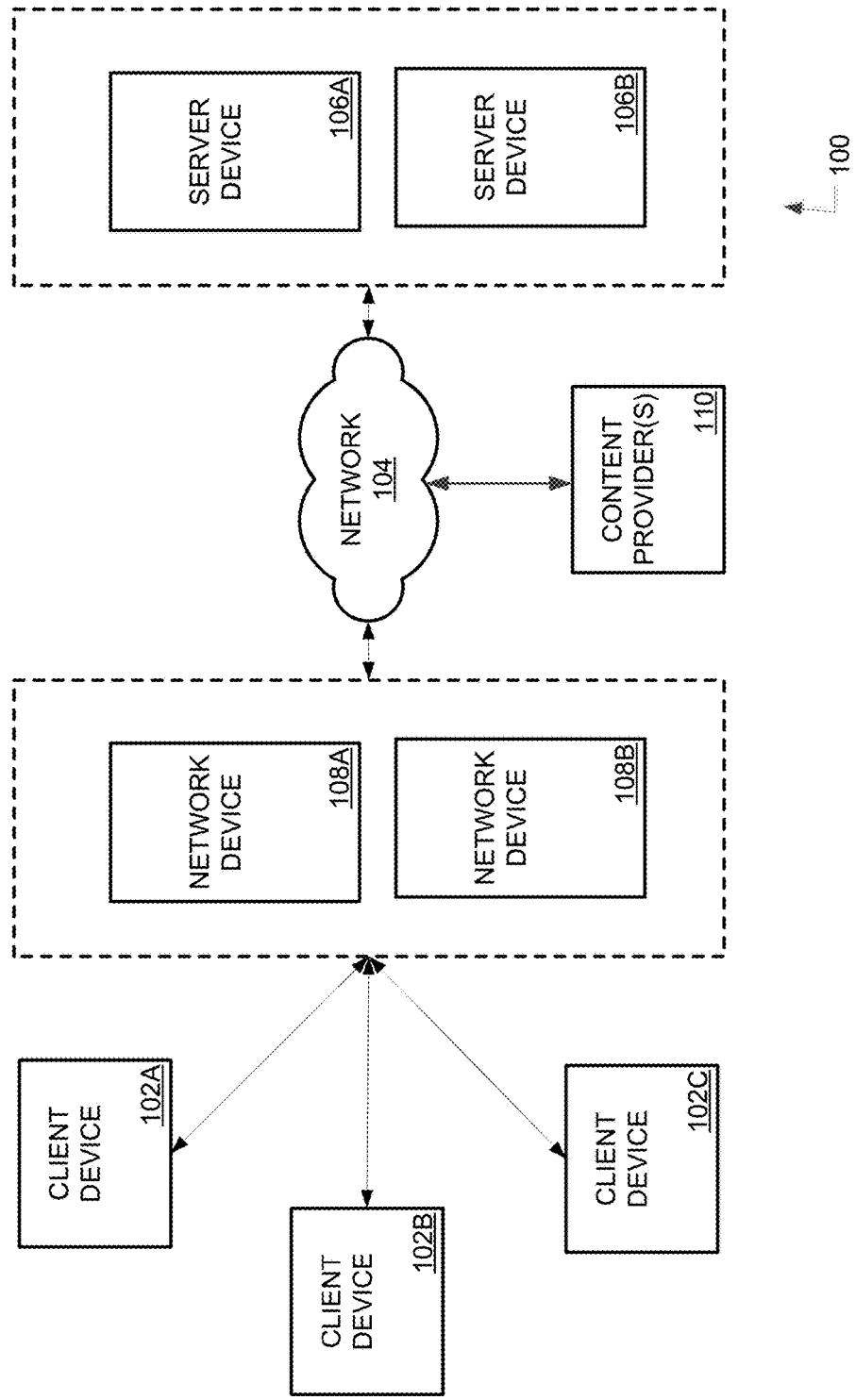
FIG. 1 illustrates an overview of an exemplary system for generating dynamic sensors as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describes systems and methods for generating dynamic sensors. A dynamic sensor, as described herein, may refer to a program (or portion thereof) that is operable to interface with one or more containers, library files or applications to prevent threats from varying threat vectors in a network ecosystem. In aspects, a device may connect to a network. The network may detect that the device has connected or is attempting to connect. In examples, such detection may include scanning for network devices, monitoring network behavior and analytics, evaluating network controller messages, etc. When a device has successfully connected to the network, the network may determine whether the device has previously been detected on the network. This determination may include evaluating one or more event logs or network connection logs. The network may additionally or alternately determine whether a detected device is identifiable. In some examples, the network may make this determination by requesting and/or evaluating a manifest from the connected device, monitoring the network traffic transmitted to/from the connected device, issuing self-identifying commands/messages to the connected device, and/or evaluating networking information from the device against a repository of device-identifying information. A manifest, as used herein, may refer to a document comprising information (e.g., application name(s), version number(s), trust information, dependencies, etc.) that is necessary to deploy, display and/or update an application or executable file. Identifying a device, as described herein, may refer to determining a device type, a device ID, device network information, a user ID, an operating system (OS), running or loading applications, etc.

In some aspects, when a connected device is not recognized by the network, a generic container may be dynamically created. A container, as used herein, may refer to a virtual machine or network/endpoint agent that is operable to analyze device behavior, network traffic, device interactions, etc. in order to prevent threats inside the network. The container may comprise one or more modules and/or predictive/statistical models. Recognizing a device, as described herein, may refer to determining whether a device has previously connected to the network and/or determining identifying information for the device. In examples, recognizing a device may include evaluating received device information and/or comparing received device information to, for example, one or more event logs or network connection logs. The generic container may be empty or may comprise default modules, such as phishing detection modules, malicious website detection modules, etc. In at least one example, the default models may be common to each container generated and/or may provide general (e.g., non-specific) computing environment protection. The computing environment, as described herein, may refer to the connected device, the network or some combination thereof. In aspects, the size and/or complexity of the computing environment may fluctuate based on, for example, the presence (or absence) of transient devices and network policies. As a result, the structure/composition of the container and/or the sensor deployment scheme (discussed below) may increase in complexity. For instance, a small home network (comprising only a few client devices) may utilize a container comprising a small number of modules and a sensor deployed to a single network appliance. However, if this small home network to expand to a larger enterprise network (comprising several client devices, servers, network appliances and policies), several modules may be added to the container and a deployment scheme where multiple instances of the dynamic sensor are provided to a plurality of devices may be utilized. In such an example, the dynamic sensors are easily and efficiently modified to reflect the changes in the computing environment.

In alternate aspects, when a connected device is recognized by the network, a device-specific container may be dynamically created. The device-specific container may be created using received device information or information in a device-identifying repository accessible to the network. In examples, such information may be used to determine the device type, device name, device OS, etc. of a connected device. Based on the determined device information, modules and/or information that are specific to the determined device may be loaded into the container. In at least one example, the device-specific modules may be based on a threat assessment profile for a particular device. A threat assessment profile, as described herein, may comprise suspected and identified threat information, trend data and behavioral analyses. The threat and trend data in the threat assessment profile may be evaluated and corresponding modules may be loaded into the device-specific container. In some aspects, a device-specific machine model may be loaded into the device-specific container. A machine model (or simply "model"), as used herein, may refer to a statistical language model that may be used to determine a probability distribution over one or more word and/or character sequences and/or to predict a response value from one or more predictors. In examples, a model may be a rule-based model, a machine-learned regressor, a machine-learned classifier, or the like. Moreover, the model may be trained and/or used by one or more components of an associated cybersecurity system or architecture. In a particular example, the device-specific machine model may be trained to identify and/or determine suspected threats (e.g., viruses, spam, phishing attacks, spyware, keystroke logging, adware, botnets, etc.) for a particular device using at least the network traffic of the device.

In aspects, after a container (e.g., generic or device-specific) has been created and/or loaded as described above, a threat intelligence module may be loaded into the container. The threat intelligence module may provide general environmental security and/or security for known or suspected threats. For example, the threat intelligence module may provide for device-independent anti-phishing protection, IP recognition and URL classification, as well as device-specific malware protection. In some aspects, an ecosystem-specific machine model may additionally or alternately be loaded into the container. As described above with respect to the device-specific machine model, the ecosystem-specific machine model may be trained and/or used by one or more components of an associated cybersecurity system or architecture. In examples, the ecosystem-specific machine model may be trained to identify and/or determine suspected threats for a particular ecosystem or network topology using one or more ecosystem rules and/or the network traffic of the various devices therein. After a container has been loaded as described above, the container may be deployed on the network. In some examples, the container may be deployed as a sensor or service that monitors and/or captures the data flow to/from devices. The container may be operable to provide dynamic, network-centric security for detected network devices by determining known or suspected threats.

Accordingly, the present disclosure provides a plurality of technical benefits including but not limited to: network-level automatic device detection; device identification-based container creation; device-specific security implementation; network-specific security implementation; single-point analysis sensor; increased cybersecurity; reduced CPU and resource utilization; flexible implementation options; training and using models to determine threats; and improved efficiency and quality for applications/services utilizing examples of the present disclosure, among other examples.

FIG. 1 illustrates an overview of an example system for generating dynamic sensors as described herein. Exemplary system 100 presented is a combination of interdependent components that interact to form an integrated whole for dynamic sensor systems. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an exemplary system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the exemplary operating environments depicted in FIG. 5. In other examples, the components of systems disclosed herein may be spread across multiple devices. For instance, input may be entered on a client device and information may be processed or accessed from other devices in a network, such as one or more server devices.

As one example, the system 100 comprises client devices 102A-C, distributed network 104, a distributed server environment comprising server device 106A-B, a network device environment comprising network devices 108A-B, and content provider(s) 110. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client device 102A may be configured to connect to a network, such as distributed network 104. Exemplary client devices include, but are not limited to, smartphones, tablets, laptops, computers, smartwatches, televisions, refrigerators, network connectable appliances, automobiles, game consoles, thermostats, security systems, medical implants, or any other type of device that may be connected as part of the IoT. In other words, a client device may be any type of electronic or computing device with network connectivity. Upon connecting to the network, client device 102A receives input via a user interface component or other input means. Examples of input may include voice, visual, touch and text data. The received input may be stored on the client device or in a data store accessible to the client device. Client devices 102B and 102C may be similarly configured to client device 102A, but may be a different device type from client device 102A. For example, input may be collected from client device 102A (e.g., a mobile phone), client device 102B (e.g., a tablet) and/or client device 102C (e.g., a laptop computer). Client devices 102A-C may be further configured to transmit the input to a server device, such as server devices 106A-B, via distributed network 104.

Server devices 106A-B may be configured to detect when, for example, client devices 102A-C connect to the network. After detecting a connection, server devices 106A-B may determine whether the detected device can be identified. When the detected device cannot be identified, server devices 106A-B may generate a generic container. When the detected device can be identified, server devices 106A-B may generate a device-specific container. In alternate aspects, the containers may be generated by a different device, such as client devices 102A-C or network devices 108A-B. Server devices 106A-B may identify and load corresponding modules and/or models (e.g., device-specific threat protection, device-specific machine models, threat intelligence modules, eco-system machine modules, etc.) into the container. Server devices 106A-B may then deploy the container into a network compliance, such as network devices 108A-B.

Network devices 108A-B may be configured to listen to and/or intercept input transmitted between client devices 102A-C, server devices 106A-B and content provider(s) 110. In examples, network devices 108A-B may be a firewall, a router, a proxy server, etc. and may comprise one or more components of the dynamic sensor system described herein. Network devices 108A-B may further be configured to receive and implement the generated container described above. In aspects, network devices 108A-B may implement the container as a sensor component or a service. The sensor component or service may then be used to sense device connections and identify transmitted input that may pose a threat to the network or the devices therein. For example, network devices 108A-B may be able to detect that content transmitted from content provider(s) 110 to client devices 102A-C comprises one or more threats. Based on the determination, network devices 108A-B may initiate one or more preventive procedures, such as terminating downloading content, quarantining files, executing a malicious content agent or filter, providing warnings to users, etc. As another example, network devices 108A-B may be able to determine that content transmitted from one client device to another comprises one or more threats. This determination may include evaluating, for example, the type of data the client device is transmitting, the types of devices with which the client device is attempting to communicate, a deviation from an established usage pattern, etc. Based on the evaluation, network devices 108A-B may begin/modify monitoring of the client device's behavior and/or one or more preventive procedures described above.

Figure 2:
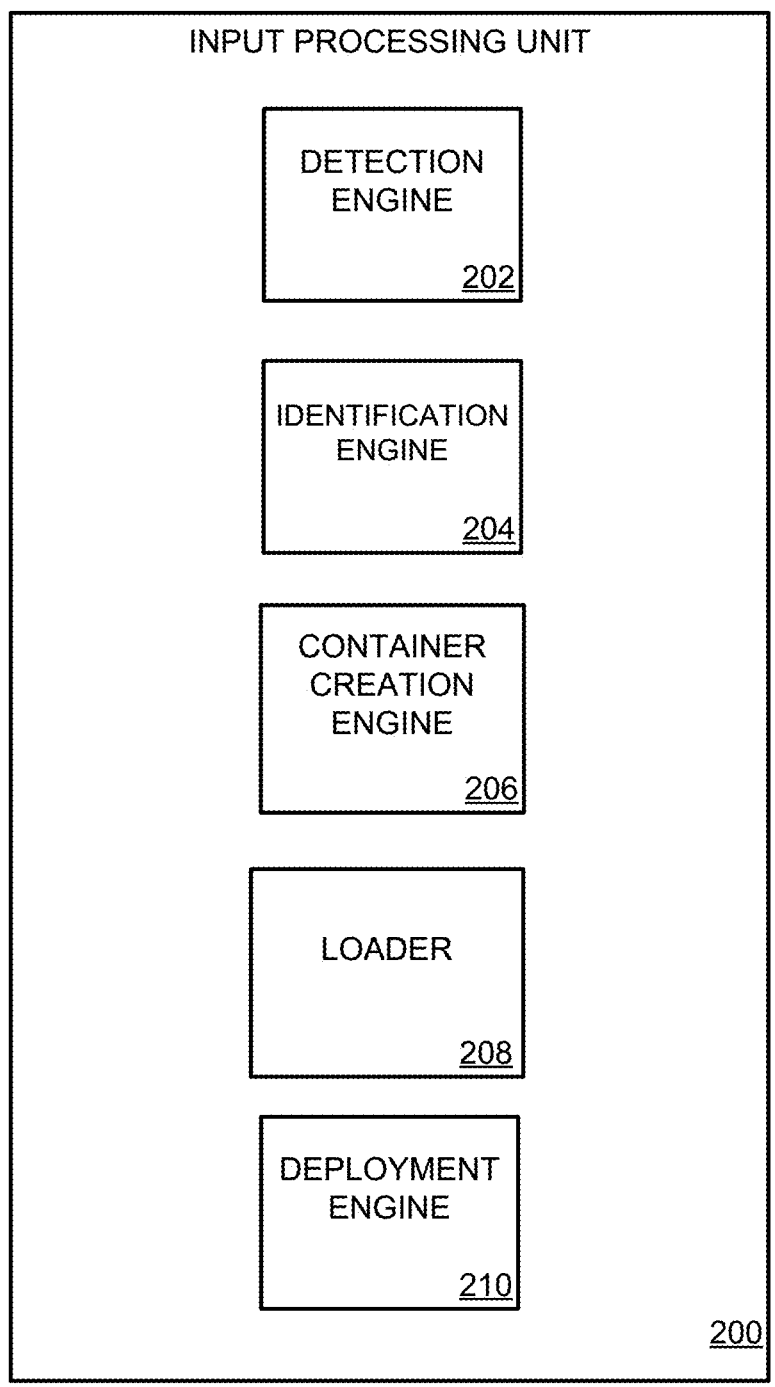
FIG. 2 illustrates an exemplary input processing unit for generating dynamic sensors as described herein.

FIG. 2 illustrates an overview of an exemplary input processing unit 200 for generating dynamic sensors, as described herein. The dynamic sensor techniques implemented by input processing unit 200 may comprise the dynamic sensor techniques and input described in FIG. 1. In alternative examples, a single system (comprising one or more components such as processor and/or memory) may perform processing described in systems 100 and 200, respectively. Further, input processing unit 200 may comprise a user interface component as described in the description of FIG. 1.

With respect to FIG. 2, input processing unit 200 may comprise detection engine 202, identification engine 204, container creation engine 206, loader 208 and deployment engine 210. Detection engine 202 may be configured to detect device connections to a network. In aspects, detection engine 202 may comprise a listener component that listens for connections or connection attempts to a network. For example, detection engine 202 may have access to a network control component (such as a DHCP server) that is operable to provide the ability to communicate (e.g., by assigning an IP address, IP range, etc.) over the network. Detection engine 202 may monitor the messages transmitted by the network control component and/or evaluate one or more event logs or network connection logs used by the network control component. In examples, monitoring and/or evaluating the message and log data may include parsing said data and performing, for example, pattern matching techniques using fuzzy logic or one or more rule sets. Based on the parsed data, detection engine 202 may determine that one or more devices have connected to a network.

Identification engine 204 may be configured to identify a device connected to a network. In aspects, identification engine 204 may access device-identifying information for a device connected to a network. For example, identification engine 204 may evaluate the event log or network connection log described above against a device lookup service or repository. The device lookup service/repository may comprise device information, network information, client/user information, behavior information, associated device groups and devices, etc. for one or more devices. Using the device lookup service/repository, identification engine 204 may determine the device ID or device type of a connected device. In another example, identification engine 204 may request device-identifying information from the connected device. For instance, identification engine 204 may request and receive a manifest file from a device. The manifest file may comprise information that identifies the device, the device type, the OS, installed applications, resource usage, privileges, etc. Identification engine 204 may use the manifest file to determine the device ID or device type of a connected device. In some aspects, identification engine 204 may additionally or alternately use the identification information to determine whether the device has previously connected to the network. In such an aspect, identification engine 204 may evaluate a white list or previously-validated list of known and/or acceptable devices.

Container creation engine 206 may be configured to create one or more containers. In aspects, container creation engine 206 may create a container based on whether identification engine 204 determines a connected device is identifiable. For example, when identification engine 204 determines that a connected device is not identifiable, container creation engine 206 may create a generic container. The generic container may be empty or may comprise one or more default modules that are loaded into each container. The default modules may be used to provide security against device- and ecosystem-independent attacks and content, such as phishing attacks, malicious websites, denial-of-service (DOS) attacks, etc. In contrast, when identification engine 204 determines that a connected device is identifiable, container creation engine 206 may create a device-specific container. The device-specific container may initially comprise the default modules described above. Container creation engine 206 may further load device-specific threat protection into the device-specific container. In examples, the device-specific threat protection may comprise suspected and identified threats, threat analysis data, and associated security information (e.g., virus definitions files, security updates, etc.) for a specific device or device type. In some examples, container creation engine 206 may further load a device-specific machine model into the device-specific container. The device-specific machine model may be operable to receive device network traffic as input. Based on the input, the device-specific machine model may determine whether the input comprises any known or suspected threats targeting a specific device. In aspects, one or more of the modules and/or models loaded into the container may be selected based on a threat assessment profile. For example, a threat assessment profile may indicate a recent increase in viruses, phishing attacks and Trojan horses targeting a particular device. As a result, the device-specific machine model may select the virus protection module, phishing module and Trojan horse module from a list of available device-specific security modules. As another example, a threat assessment profile may indicate a geographic region or set of IP addresses that has been identified as transmitting malicious content. As a result, the container creation engine 206 may select URL classification modules and IP-recognition and/or blocking modules. In either example, the selected modules may then be loaded into the container.

Loader 208 may be configured to load one or more modules and/or models into a container. In aspects, loader 208 may access a container created and/or loaded by container creation engine 206. Loader 208 may select one or more modules and/or models from a list of available security modules. In examples, the list may comprise general (e.g., device- and ecosystem-independent) security modules, device-specific security modules, ecosystem-specific security modules, and various machine models. Loader 208 may select modules/models based on a default or generic set of modules/models, a profile (such as the threat assessment profile described above), the network ecosystem, or some combination thereof. For example, loader 208 may select a threat intelligence module from the list of available security modules. The threat intelligence module may be operable to provide general computing environmental security for known or suspected threats. In such an example, the threat intelligence module may provide such security by identifying and/or classifying network traffic from detected devices using, for example, anti-phishing techniques, IP recognition, malware detection, etc. In another example, loader 208 may additionally or alternately select an ecosystem-specific machine model from the list of available security modules. The ecosystem-specific machine model may be operable to receive device network traffic as input. Based on the input, the ecosystem-specific machine model may determine whether the input comprises any known or suspected threats to a network or a particular network ecosystem. In aspects, loader 208 may load the selected modules/models in the container.

Deployment engine 210 may be configured to deploy a container to a network. In aspects, deployment engine 210 may access a container loaded by container creation engine 206 and/or loader 208. Deployment engine 210 may implement the container as part of a dynamic sensor. The dynamic sensor, as described herein, may be a program (or portion thereof) that is operable to interface with one or more containers, library files or applications to prevent threats from varying threat vectors in a network ecosystem. In examples, deployment engine 210 may create the dynamic sensor (or an instance thereof) after accessing a container using one or more components of input processing unit 200. For instance, deployment engine 210 may have access to a sensor-creation method provided by input processing unit 200. Upon invoking the sensor-creation method, input processing unit 200 may create an instance of a sensor that is accessible to deployment engine 210. Deployment engine 210 may then make the container accessible to and/or usable by the sensor or sensor instance. In another example, a dynamic sensor may be created by a separate component of input processing unit 200 (such as loader 208 or a container creation component). Deployment engine 210 may access the dynamic sensor and integrate the container (of portions of the container's functionality) with the dynamic sensor. In aspects, deployment engine 210 may deploy the dynamic sensor (or instances thereof) to the network or one or more devices in the network (e.g., endpoint device, network appliances, etc.). For example, deployment engine 210 may make the dynamic sensor available as a service to a firewall or router in the network. The dynamic sensor may then evaluate the network traffic of various connected devices for threats as the network traffic is transmitted to the firewall/router. As another example, deployment engine 210 may install the dynamic sensor (or instances thereof) on one or more endpoint computing devices in the network. The dynamic sensor(s) may then evaluate the network traffic sent/received by the endpoint computing devices. In such an example, the dynamic sensor(s) may be capable of protecting network-connected device from each other, as well as from content received from external devices, such as content providers(s) 110.

Figure 3:
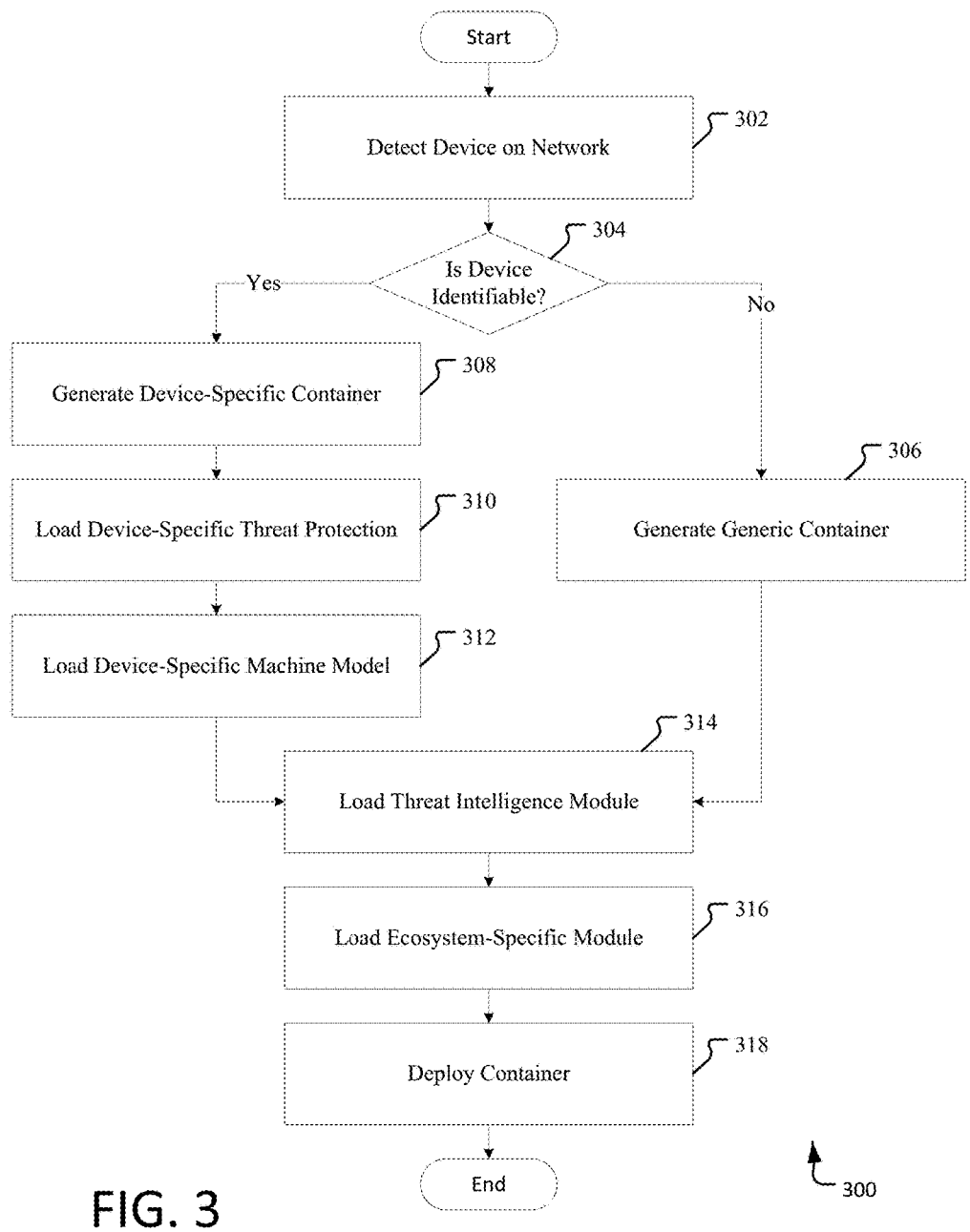
FIG. 3 illustrates an example method of generating dynamic sensors as described herein.

FIG. 3 illustrates an example method of generating dynamic sensors, as described herein. In aspects, method 300 may be executed by an exemplary system such as system 100 of FIG. 1. In examples, method 300 may be executed on a device comprising at least one processor configured to store and execute operations, programs or instructions. However, method 300 is not limited to such examples. In other examples, method 300 may be performed on an application or service for generating dynamic sensors. In at least one example, method 300 may be executed (e.g., computer-implemented operations) by one or more components of a distributed network, such as a web service/distributed network service (e.g. cloud service).

Exemplary method 300 begins at operation 302 where a device may be detected on a network. In aspects, a server device, such as server device 106A-B, may have a network connection detection component, such as detection engine 202. The detection component may listen for connections or connection attempts to a network, such as distributed network 104. When the detection component detects that a client device, such as client devices 102A-C, has connected or is attempting to connect to the network, the detection component may monitor the messages transmitted to/from a network control component and/or evaluate one or more event or network connection logs used by the network control component. For example, when a device attempts to connect to a network, the device may request an IP address and networking parameters from a DHCP server associated with the network. The DHCP server may record the connection details (e.g., user ID, device ID, connection request date/time, assigned IP, etc.) in a network connections log and provide portions of the connection details to the client device. The detection component may evaluate the network connections log and/or the message traffic of the connecting client device to determine whether the client device has successfully connected to the network. In some examples, an indication of this determination may be recorded in one or more log files or data stores.

At decision operation 304, a decision is made regarding whether a connected device is identifiable. In aspects, an identification component, such as identification engine 204, may be used to identify a device connected to a network. The identification process may comprise providing portions of the connection details to a device lookup service or repository, comparing connection details to known or previously-received connection details, requesting a manifest file from the connected device, issuing self-identifying commands/messages to the connected device, and/or evaluating the network traffic generated by the connected device. The identification process may be used to identify the device name, device type, device OS, etc. If the identification component determines the identity of a connected device, flow proceeds to operation 308. If the identification component determines the identity of a connected device is indeterminable, flow proceeds to operation 306.

At operation 306, a generic container may be generated. In aspects, a container creation component, such as container creation engine 206, may be used to create a generic container when the identity of a connected device is indeterminable. The container creation component may be associated with (and/or accessible by) one or more server devices in the network. In examples, creating the generic container may comprise instantiating a (e.g., generic) container object accessible to one or more network devices, or initiating a program or service for maintaining containers. The generic container may be empty or may comprise one or more default modules that are loaded into each generated container. In aspects, the default modules may be used to provide security against device- and ecosystem-independent attacks and content. In at least one example, the default modules may be maintained by a module maintenance service that provides for updating, removing and adding new modules to a default module list. The default module list may be modified based on, for example, manual observation, threat trend analyses, or updates to a security service/system. In some aspects, the default models may be selected based on a threat profile. The threat profile may comprise suspected and identified threat information, trend data and behavioral analyses.

At operation 308, a device-specific container may be generated. In aspects, the container creation component described above may be used to create a device-specific container when the identity of a connected device is determined. Creating the device-specific container may comprise instantiating a (e.g., device-specific) container object accessible to one or more network devices, or initiating a program or service for maintaining containers. The device-specific container may comprise one or more default modules maintained by a module maintenance service that provides for updating, removing and adding new modules to a default module list.

At operation 310, device-specific threat protection may be loaded. In aspects, a container creation component or loading component, such as loader 208, may load one or more device-specific threat protection modules into the device-specific container. The container creation component may identify and/or select device-specific modules using the module maintenance service described above. For example, after a device detected on a network has been identified, the module maintenance service may access the identification information for the device. The module maintenance service may then identify and/or select modules that are specifically designed to target threats to the detected device. As a particular example, a detected device may be determined to be an iOS device. The container creation component may query a module maintenance service for past and recent threats targeting the iOS device. The module maintenance service may evaluate the past and recent threats or may query a separate service (e.g., an anti-virus service, cyber-security solution, etc.) for the information. Based on the determined threats to the iOS device (e.g., historic vulnerabilities to worms, a recent uptick in spyware, etc.), the module maintenance service may provide a corresponding list/set of available iOS device-specific modules. In one example, the list of modules may be presented to a user for navigation/selection and may be prioritized according to date of detection. The user may submit a selection of modules using an interface provided by, for example, the server device. In aspects, the selected/provided device-specific modules may then be loaded into the device-specific container.

At operation 312, a device-specific machine model may be loaded. In aspects, a container creation component or loading component may load one or more device-specific machine models into the device-specific container. The container creation component may identify and/or select device-specific machine models using the module maintenance service described above. For example, a module maintenance service may comprise a machine model trained to detect/classify threats to a particular iOS device. The machine model may be trained using input (e.g., network traffic, log data, training data sets, etc.) associated with the iOS devices. In a particular example, the module maintenance service may include a plurality of machine models for an iOS device. In such an example, each machine model may be trained to target a different identified threat (e.g., a pharming machine model, an adware machine model, a keystroke logging machine model, etc.). The module maintenance service may present a list of selectable machine models or may select a suggested list of machine models based on, for example, a threat profile. In aspects, the selected/provided device-specific machine models may then be loaded into the device-specific container.

At operation 314, a threat intelligence module may be loaded. In aspects, a container creation component or loading component may load a threat intelligence module into a container generated in operation 306 or 308. The threat intelligence module may be included in a module maintenance service and presented in a list of security modules/models as described above. The threat intelligence module may provide general environmental security for known or suspected threats for several computing devices. For example, one or more threat intelligence modules may be generated by components and/or services accessible to the container creation component/loading component. Such components and/or services may include anti-virus services, network and/or endpoint cybersecurity solutions, etc. In some examples, the threat intelligence module may comprise threats, threat data and/or threat security for various network devices (e.g., production and non-production device) and device types that have been previously detected/evaluated.

At operation 316, an ecosystem-specific machine model may be loaded. In aspects, a container creation component or loading component may load one or more ecosystem-specific machine models into a container generated in operation 306 or 308. The container creation component may identify and/or select ecosystem-specific machine models using the module maintenance service described above. For example, a module maintenance service may comprise a machine model trained to detect/classify threats to a particular ecosystem or network configuration. The machine model may be trained using input (e.g., network traffic, log data, training data sets, etc.) associated with previously-connected network devices. In a particular example, the module maintenance service may include a plurality of machine models for ecosystem. In such an example, each machine model may be trained to provide security for a particular ecosystem, a particular identified threat, or a particular form/method of communication (e.g., peer-to-peer, client-server, etc.). The module maintenance service may present a list of selectable machine models or may select a suggested list of machine models as described above.

At operation 318, a container may be deployed. In aspects, a deployment component, such as deployment engine 210, may be used to combine a generated container with one or more dynamic sensors. In examples, a dynamic sensor may be created by a sensor generation component as part of method 300. For instance, at the conclusion of operation 316, a dynamic sensor may be created using one or more components of (or accessible by) servers 106A-B. In another example, a dynamic sensor may be created prior to detecting a device on a network. After a container has been loaded as described above, a dynamic sensor object may be instantiated or selected from a pool of available sensor instances. In such examples, the dynamic sensor may be configured to be integrated with a container, modules and/or models to identify threats from varying threat vectors in a network ecosystem. After the dynamic sensor and the container have been integrated, the deployment component may deploy the dynamic sensor to the network. In some aspects, the dynamic sensor may be made available as a service to a network appliance, such as network devices 108A-B. In other aspects, the dynamic sensor may be installed on one or more devices in a network. The dynamic sensor(s) may then evaluate the message traffic transmitted over the network for known or suspected threats from transient devices.

Figure 4:
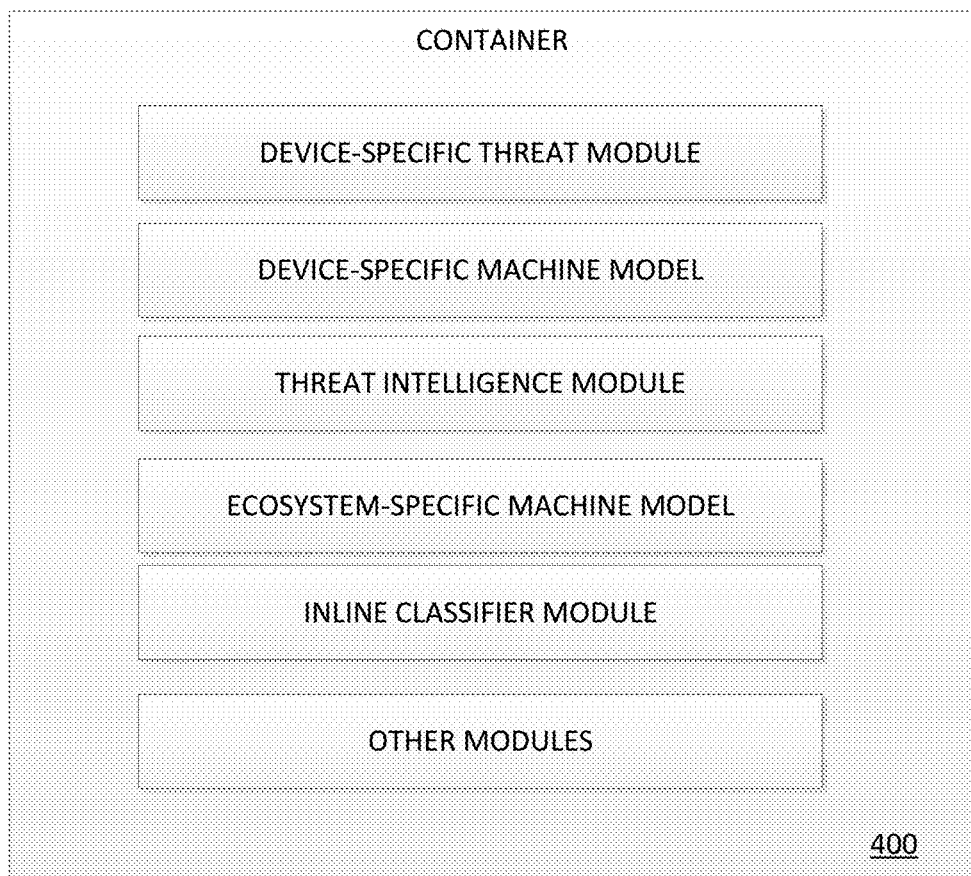
FIG. 4 illustrates an exemplary container as described herein.

FIG. 4 illustrates an exemplary container as described herein. In aspects, container 400 may be generated using an exemplary method, such as method 300 of FIG. 3, and implemented by a sensor in an exemplary system, such as system 100 of FIG. 1. As illustrated in FIG. 4, container 400 may comprises a device-specific threat module, a device-specific machine module, a threat intelligence module, an ecosystem-specific machine model, an inline classifier module, and one or more other modules. As described above, the device-specific threat module may comprise suspected and identified threats, threat analysis data, and/or associated security information for a determined device or device type. The device-specific machine model may be operable to use device data (e.g., network traffic, device identification information, log data, etc.) as input to determine whether the input comprises any known or suspected threats targeting a specific device. The threat intelligence module may be operable to provide general computing environmental security for known or suspected threats by identifying and/or classifying network traffic from detected devices. The ecosystem-specific machine model may be operable to use network traffic as input to determine whether the input comprises any known or suspected threats to a network or a particular network ecosystem. The inline classifier module may be received from a cybersecurity solution executing in, or accessible, to system 100 of FIG. 1. In examples, the inline classifier module may be operable to analyze downloading data, calculate a score corresponding to the malicious status of the file as the information is being analyzed, and provide corrective actions based upon the score. In at least one example, the inline classifier module may be device- or content-specific. Alternate modules/models may also be included in the container. For example, an IP scanning module may be included. The IP scanning module may be operable to facilitate the detection and/or identification of devices detected in the network by providing predefined payloads (soliciting an expected response) to detected devices.

Figure 5:
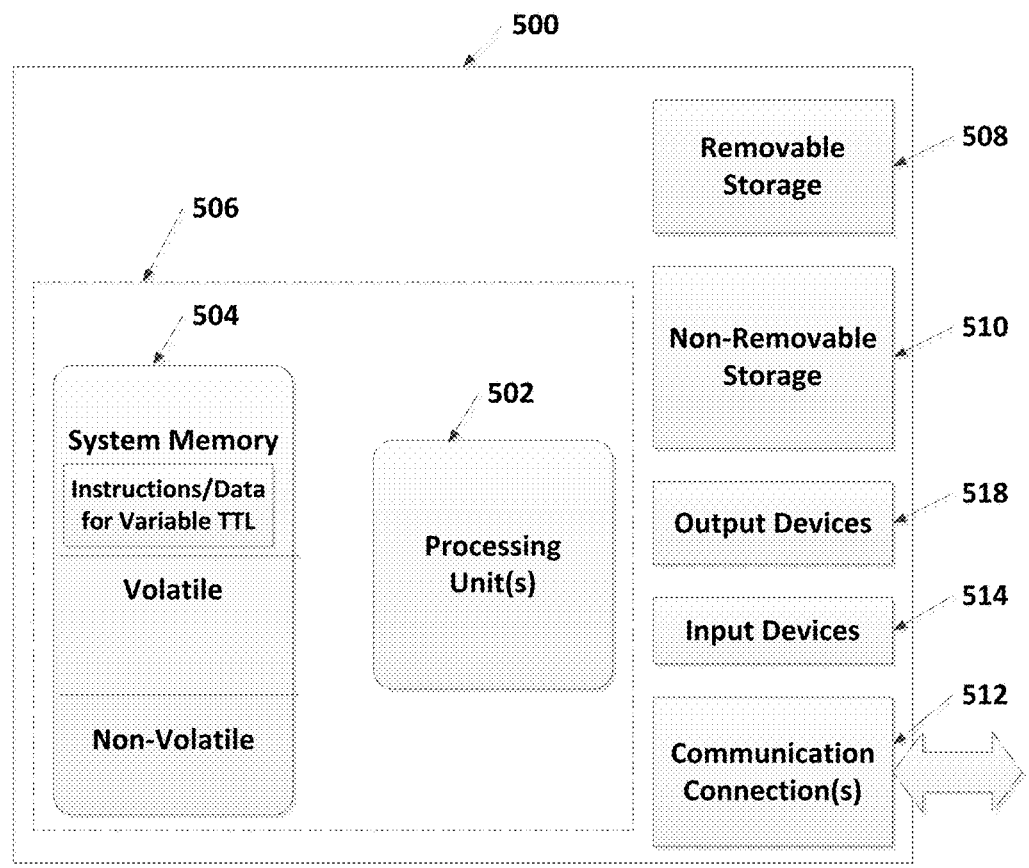
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, monitored data, container information (e.g., generic and/or device-specific), modules (e.g., threat modules, inline classifier modules, etc.) and/or models (generic, device-specific, ecosystem-specific, etc.), instructions to perform the methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method for generated dynamic sensors, the method comprising:
   detecting a device on a network;
   determining whether the detected device is identifiable based on an evaluation of device data for the device, wherein the evaluation comprises at least one of: requesting a manifest file from the device or issuing self-identifying commands to the device, and wherein the evaluation provides information that identifies the device, the device type and at least one of the operating system, installed applications, resource usage, or privileges;
   when the device is not identifiable:
   generating a generic container;
   loading a threat intelligence module into the generic container, wherein the threat intelligence module provides general computing environment security for at least one of known threats and suspected threats;
   loading an ecosystem-specific module into the generic container, wherein the ecosystem-specific module provides security for at least one of: an identified ecosystem, an identified threat, and an identified form of communication; and
   deploying the generic container as a dynamic sensor; and
   when the device is identifiable:
   generating a device-specific container, wherein the device-specific container is based on the device information;
   loading device-specific threat protection into the device-specific container;
   loading a device-specific machine model into the device-specific container;
   loading the threat intelligence module into the device-specific container;
   loading the ecosystem-specific module into the device-specific container; and
   deploying the device-specific container as a dynamic sensor.

2. The system of claim 1, wherein detecting the device comprises at least one of:
   identifying an attempt, by the device, to connect to the network; and
   determining the device is currently connected to the network.

3. The system of claim 2, wherein detecting the device further comprises:
   monitoring the network activity associated with the device; and
   evaluating the network activity to determine the device data for the device.

4. The system of claim 3, wherein determining whether the detected device is identifiable comprises evaluating the device data for the device, wherein the evaluating comprises at least one of:
   providing the device data to a device lookup service; and
   comparing connection details in the device data to previously-received connection details.

5. The system of claim 1, wherein at least one of the generic container and the device-specific container comprises one or more default modules, wherein the one or more default modules are maintained by a module maintenance service.

6. The system of claim 5, wherein the module maintenance service manages a default module list, wherein the default module list is modified based on at least one of manual observation, threat trend analyses, and security service updates.

7. The system of claim 1, wherein the device-specific threat protection comprises a set of modules corresponding to one or more threats, wherein the set of modules is presented to a user via a user interface, and the set of modules is prioritized according to at least one of; date of detection and number of devices impacted.

8. The system of claim 1, wherein the device-specific machine model is trained using input associated with at least one of the device and the device type.

9. The system of claim 1, wherein the threat intelligence module provides general computing environment security for at least one of: known threats and suspected threats.

10. The system of claim 9, wherein providing the general computing environment security comprises:
analyzing downloading data associated with the device;
calculating a score corresponding to the security of the data based on the analysis; and
providing corrective actions based upon the score.

11. The system of claim 1, wherein the ecosystem-specific module is trained using input associated with previously-connected network devices, and wherein the ecosystem-specific module is trained to provide security for at least one of: a particular ecosystem, a particular identified threat, and a particular form of communication.

12. The system of claim 1, wherein deploying the device-specific container comprises integrating the device-specific container with a sensor component to generate the dynamic sensor.

13. The system of claim 12, wherein deploying the device-specific container further comprises installing the dynamic sensor on one or more devices in the network.

14. The system of claim 1, wherein the dynamic sensor is configured to evaluate message traffic transmitted over the network for known or suspected threats from transient devices.

15. A method for generated dynamic sensors, the method comprising:
detecting a device on a network;
determining whether the detected device is identifiable based on an evaluation of device data for the device, wherein the evaluation comprises at least one of: requesting a manifest file from the device or issuing self-identifying commands to the device, and wherein the evaluation provides information that identifies the device, the device type and at least one of the operating system, installed applications, resource usage, or privileges;
when the device is not identifiable:
generating a generic container;
loading a threat intelligence module into the generic container, wherein the threat intelligence module provides general computing environment security for at least one of known threats and suspected threats;
loading an ecosystem-specific module into the generic container, wherein the ecosystem-specific module provides security for at least one of: an identified ecosystem, an identified threat, and an identified form of communication; and
deploying the generic container as a dynamic sensor; and when the device is identifiable:
generating a device-specific container, wherein the device-specific container is based on the device information;
loading device-specific threat protection into the device-specific container;
loading a device-specific machine model into the device-specific container;
loading the threat intelligence module into the device-specific container;
loading the ecosystem-specific module into the device-specific container; and
deploying the device-specific container as a dynamic sensor.

16. The method of claim 15, wherein detecting the device comprises:
accessing a network control component that is operable to enable the device to communicate over the network; and
monitoring messages transmitted by the network control component.

17. The method of claim 15, wherein determining whether the detected device is identifiable comprises evaluating the device data for the device, wherein the evaluating comprises at least one of:
providing the device data to a device lookup service; and
comparing connection details in the device data to previously-received connection details.

18. The method of claim 15, wherein the device-specific threat protection comprises one or more modules corresponding to one or more threats to the device, wherein the one or more modules is selected based on a threat assessment profile.

19. The method of claim 15, wherein deploying the device-specific container comprises:
integrating the device-specific container with a sensor component to generate the dynamic sensor; and
installing the dynamic sensor on one or more devices in the network.

20. A hardware computer-readable storage device encoding computer executable instructions which, when executed by at least one processor, performs a method for venue detection, the method comprising:
detecting a device on a network;
determining whether the detected device is identifiable based on an evaluation of device data for the device, wherein the evaluation comprises at least one of: requesting a manifest file from the device or issuing self-identifying commands to the device, and wherein the evaluation provides information that identifies the device, the device type and at least one of the operating system, installed applications, resource usage, or privileges;
when the device is not identifiable:
generating a generic container;
loading a threat intelligence module into the generic container, wherein the threat intelligence module provides general computing environment security for at least one of known threats and suspected threats;
loading an ecosystem-specific module into the generic container, wherein the ecosystem-specific module provides security for at least one of: an identified ecosystem, an identified threat, and an identified form of communication; and
deploying the generic container as a dynamic sensor; and when the device is identifiable:
generating a device-specific container, wherein the device-specific container is based on the device information;
loading device-specific threat protection into the device-specific container;
loading a device-specific machine model into the device-specific container;
loading the threat intelligence module into the device-specific container;
loading the ecosystem-specific module into the device-specific container; and
deploying the device-specific container as a dynamic sensor.

\* \* \* \* \*